United States Patent
Ortega

(10) Patent No.: US 7,574,426 B1
(45) Date of Patent: Aug. 11, 2009

(54) EFFICIENTLY IDENTIFYING THE ITEMS MOST RELEVANT TO A CURRENT QUERY BASED ON ITEMS SELECTED IN CONNECTION WITH SIMILAR QUERIES

(75) Inventor: Ruben E. Ortega, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 306 days.

(21) Appl. No.: 11/097,468

(22) Filed: Mar. 31, 2005

(51) Int. Cl.
G06F 7/00 (2006.01)
G06F 17/30 (2006.01)

(52) U.S. Cl. ........................................ 707/3; 707/104.1

(58) Field of Classification Search ........................ None
See application file for complete search history.

(56) References Cited

U.S. PATENT DOCUMENTS

| | | | |
|---|---|---|---|
| 6,006,222 | A | 12/1999 | Culliss |
| 6,064,980 | A * | 5/2000 | Jacobi et al. ................... 705/26 |
| 6,185,558 | B1 * | 2/2001 | Bowman et al. ............... 707/5 |
| 6,421,675 | B1 * | 7/2002 | Ryan et al. ................... 707/100 |
| 6,546,388 | B1 * | 4/2003 | Edlund et al. ................... 707/5 |
| 6,631,372 | B1 | 10/2003 | Graham |
| 6,865,571 | B2 * | 3/2005 | Inaba et al. ..................... 707/5 |
| 2003/0172075 | A1 * | 9/2003 | Reisman ....................... 707/10 |
| 2004/0083127 | A1 * | 4/2004 | Lunsford et al. ............... 705/10 |

FOREIGN PATENT DOCUMENTS

WO  WO 99/06924  2/1999

OTHER PUBLICATIONS

"Direct Hit Search Engine," http://web.archive.org/web/20000816061012/directhit.com/about/products/search_engine.html, Aug. 16, 2000.*
"Direct Hit Shopping Engine," http://web.archive.org/web/20001027051006/directhit.com/about/products/shopping_engine.html, Oct. 27, 2000.*
"Direct Hit Search Engine," http://web.archive.org/web/20000816061012/directhit.com/about/products/search_engine.html, Aug. 16, 2000.*
"Direct Hit Shopping Engine," http://web.archive.org/web/20001027051006/directhit.com/about/products/shopping_engine.html, Oct. 27, 2000.*

* cited by examiner

*Primary Examiner*—John E Breene
*Assistant Examiner*—Aleksandr Kerzhner
(74) *Attorney, Agent, or Firm*—Townsend and Townsend and Crew LLP

(57) ABSTRACT

A facility for processing a query made up of one or more query terms is described. The facility receives the query in a search engine. In the search engine, the facility generates a search result that is made up of items. The generated search result includes items with which are associated one or more of the query terms of the received query. The generated search result further reflects the extent to which users have selected the items of the generated search result when the items of the generated search result have appeared in search results generated for queries having one or more query terms in common with the received query.

23 Claims, 3 Drawing Sheets

EFFICIENTLY IDENTIFYING THE ITEMS MOST RELEVANT TO A CURRENT QUERY BASED ON ITEMS SELECTED IN CONNECTION WITH SIMILAR QUERIES

TECHNICAL FIELD

The described technology is directed to the field of query processing.

BACKGROUND

Many World Wide Web sites permit users to perform searches to identify a small number of interesting items among a much larger domain of items. As an example, several web index sites permit users to search for particular web sites among most of the known web sites. Similarly, many online merchants, such as booksellers, permit users to search for particular products among all of the products that can be purchased from a merchant. In many cases, users perform searches in order to ultimately find a single item within an entire domain of items.

In order to perform a search, a user submits a query containing one or more query terms. The query also explicitly or implicitly identifies a domain of items to search. For example, a user may submit a query to an online bookseller containing terms that the user believes are words in the title of a book. A query server program processes the query to identify within the domain items matching the terms of the query. The items identified by the query server program are collectively known as a query result. In the example, the query result is a list of books whose titles contain some or all of the query terms. The query result is typically displayed to the user as a list of items. This list may be ordered in various ways. For example, the list may be ordered alphabetically or numerically based on a property of each item, such as the title, author, or release date of each book. As another example, the list may be ordered based on the extent to which each identified item matches the terms of the query.

When the domain for a query contains a large number of items, it is common for query results to contain tens or hundreds of items. Where the user is performing the search in order to find a single item, application of conventional approaches to ordering the query result often fail to place the sought item or items near the top of the query result, so that the user must read through many other items in the query result before reaching the sought item. In view of this disadvantage of conventional approaches to ordering query results, a new, more effective technique for automatically ordering query results in accordance with collective and individual user behavior would have significant utility.

U.S. Pat. No. 6,185,558 describes a two-step approach to identifying items most relevant to a current query based upon items selected in connection with similar earlier queries. In particular, the described approach first (1) uses a query engine in a conventional manner to produce a conventional query result for a query, then (2) uses a separate query result processing component that uses information about items selected in connection with similar earlier queries to filter, sort, and/or augment the conventional query result to identify items most relevant to the query.

While this two-step approach can be quite successful at identifying items most relevant to a query, it can be inefficient in several aspects. First, separate search engine and query result processing programs must typically be implemented and maintained. Also, the operation of these programs must typically be coordinated to permit the result processing program to process results produced by the query engine. Further, operating both programs may require significant processing resources, computer hardware, and/or total elapsed time to produce processed query results.

An alternative approach to identifying items most relevant to a current query based upon items selected in connection with similar earlier queries that was more efficient would therefore have significant utility.

DETAILED DESCRIPTION

Figure 1:
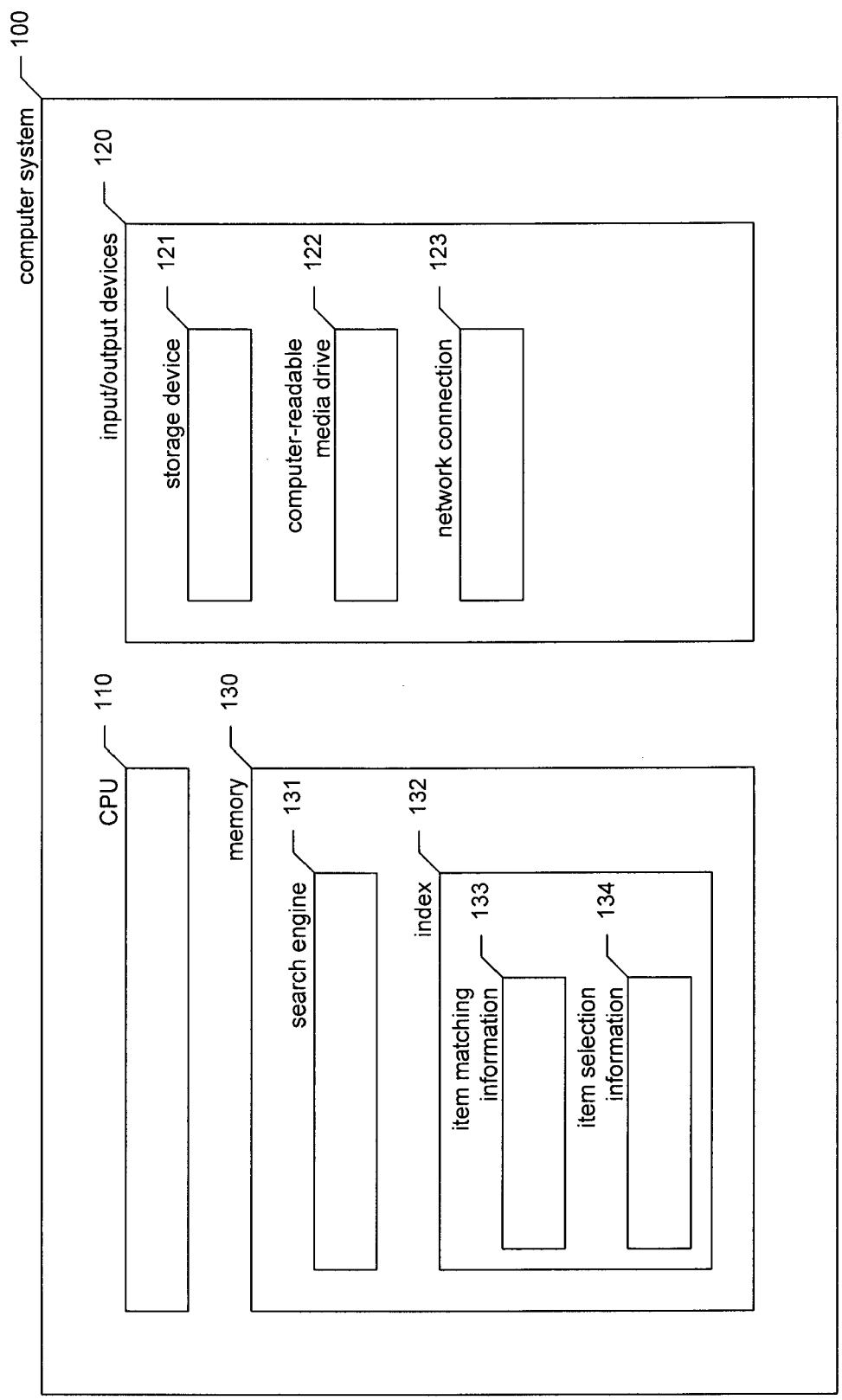
FIG. 1 is a high-level block diagram showing a typical computer system upon which the facility executes.

A software facility ("the facility") that uses a search engine to identify items most relevant to a query made up of query terms based on items commonly selected in connection with similar queries is described. The facility provides to the search engine an index that includes, for each item in a query domain, both (1) item matching information usable by the search engine to determine whether the item satisfies each query, and (2) item selection information usable by the search engine to identify query terms to which the item is particularly relevant. By using the search engine to determine the relevancy of items to a query, the facility is able to avoid or reduce various different kinds of overhead incurred in performing the relevancy determination in a post-processing phase outside the search engine.

In some embodiments, the item selection information takes the form of a special field stored in the index for each item that contains one or more occurrences of each term determined by the facility to be particularly relevant to the item. This special field is referred to herein variously as a "selection field" or a "selection-purchase field." In some embodiments, the number of occurrences of each term in the special field reflects the relative level of relevance of the term to the item.

In some embodiments, the facility populates the item selection information in the index based upon rating scores generated for combinations of one item and one term using one or more rating functions. These scores typically reflect, for a particular item and term, how often users have selected the item when the item has been identified in query results produced for queries containing the term. In various embodiments, the facility bases rating scores on different kinds of selection actions performed by the users on items identified in query results. These include whether the user displayed additional information about an item, how much time the user spent viewing the additional information about the item, how many hyperlinks the user followed within the additional information about the item, whether the user added the item to his or her shopping basket, and whether the user ultimately purchased the item. In some embodiments, the facility permits different weights to be attributed to different selection actions, such that, for example, an item purchase selection action has greater impact on ranking scores than does a display additional item information action. In some embodiments, the set of selection actions considered by the facility may be adapted to rank items of various types, including products for sale and/or their description pages at a web merchant, other kinds of web pages, and other sorts of documents, such as journal articles. In some embodiments, the facility generates ranking scores that incorporate information about the failure of users to perform selection actions with respect to items included in search results for queries containing particular terms.

In various embodiments, the facility also considers selection actions not relating to query results, such as typing an item's item identifier rather than choosing the item from a query result. In some embodiments, the facility incorporates into the ranking process information about the user submitting the query by maintaining and applying separate rating scores for users in different demographic groups, such as those of the same sex, age, income, or geographic category. In some embodiments, the facility incorporates behavioral information about specific users. Further, rating scores may be produced by a rating function that combines different types of information reflecting collective and individual user preferences. In some embodiments, the facility utilizes specialized strategies for incorporating into the rating scores information about queries submitted in different time frames. In some embodiments, the facility adds to the index additional selection fields and provides either exclusive or weighted searches depending upon the relative importance of the additional selection fields. In some embodiments, other selection fields such as a "selection-geographic" field and a "selection-demographic" field provide different contributions to the scoring. In some embodiments, the facility excludes such information where it is not important to a particular query.

By producing ranked queries in some or all of the manners described above, the facility reduces or eliminates any needs associated with conventional approaches to implement and maintain separate search engine and query result processing programs; coordinate the operation of such separate programs; and/or devote significant resources to the operation of both programs, such as processing resources, computer hardware, and/or total elapsed time to produce processed query results.

FIG. 1 is a high-level block diagram showing a typical computer system upon which the facility executes. As shown in FIG. 1, the computer system 100 comprises a central processing unit (CPU) 110, input/output devices 120, and a computer memory (memory) 130. Among the input/output devices is a storage device 121, such as a hard disk drive; a computer-readable media drive 122, which can be used to install software products, including the facility, which are provided on a computer-readable medium, such as a CD-ROM; and a network connection 123 for connection the computer system 100 to other computer systems (not shown). The memory 130 contains a search engine 131 that processes queries made up of query terms, such as the FAST Data Search search engine from Fast Search & Transfer ASA, or such as the Apache Lucene search engine available on the Internet at lucene.apache.org/java/docs/index.html. In some embodiments, the search engine 131 used supports individual field weighting, and/or term frequency inverse document frequency scoring. The memory further includes an index 132 used by the search engine to process search queries. The index contains item matching information 133 used to identify items in the query domain that satisfy the query, as well as item selection information 134, indicating the extent to which users have selected particular items when included in a search result produced for particular query terms. As one example, the index may be organized such that each item has its own record in the index, the record including one or more item matching information fields for the item and one or more item selection information fields for the item. Those skilled in the art will recognize that the facility may also be implemented on computer systems having different configurations.

Figure 2:
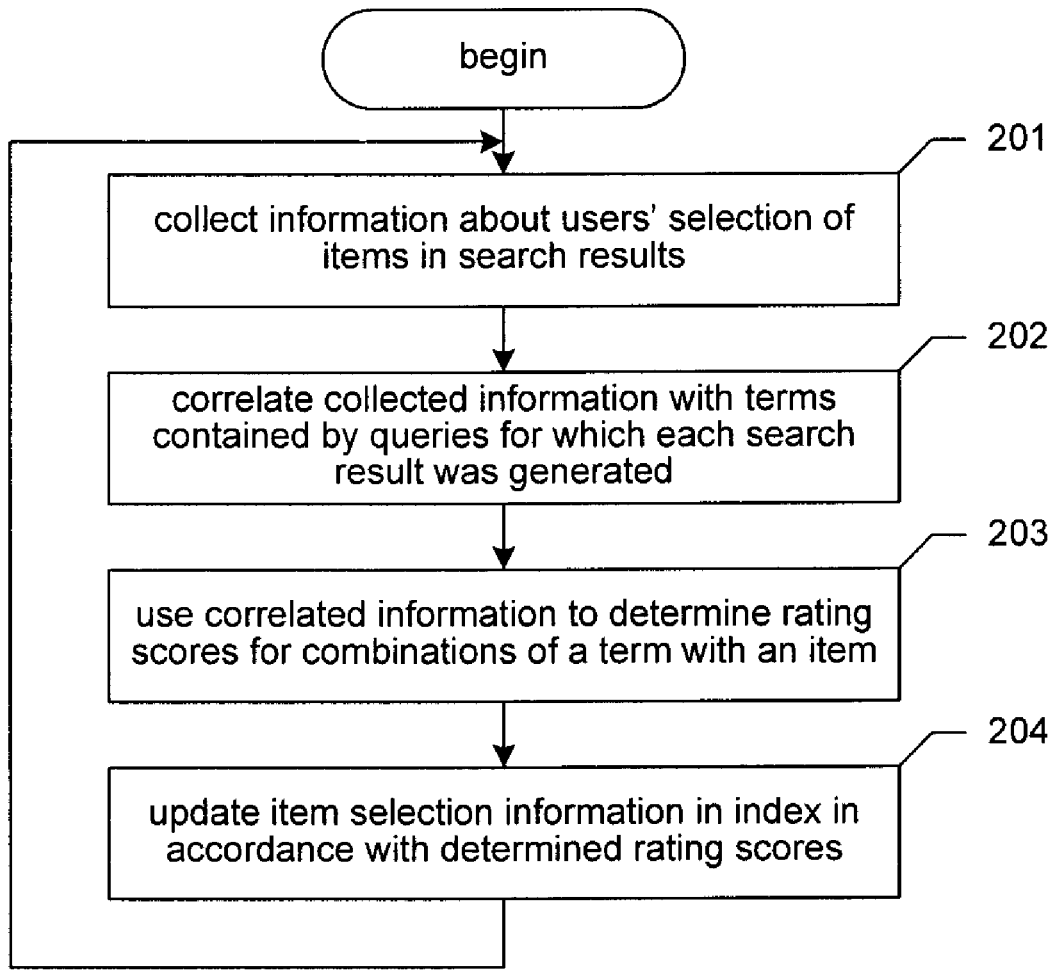
FIG. 2 is a flow diagram showing steps typically performed by the facility in order to augment the index used by the search engine to include item selection information.

FIG. 2 is a flow diagram showing steps typically performed by the facility in order to augment the index used by the search engine to include item selection information. In step 201, the facility collects information about the selection by users in a population of users of items appearing in search results. In step 202, the facility correlates the information collected in step 201 with terms contained by queries for which each search result was generated. In step 203, the facility uses the correlated information produced in step 202 to determine rating scores for combinations of a term with an item that indicate the extent to which the item has been selected from search results produced for queries containing the term. For example, for a sample children's book item, THE CAT IN THE HAT, the facility may determine a score of 207 for the term "cat" and a score of 100 for the term "Seuss." Additional details about ways in which steps 201-203 may be performed and user actions upon which they may be based are provided by U.S. Pat. No. 6,185,558, which is hereby incorporated by reference in its entirety.

In step 204, the facility updates item selection information stored in the index in accordance with the rating scores determined in step 203. Table 1 below contains a sample index entry for the example item mentioned above.

TABLE 1

| field | field contents |
|---|---|
| ID | 12345678 |
| Type | Book |
| Title | The Cat in the Hat |
| Author | Dr. Seuss |
| Subject | Children's books |
| Selection | cat cat cat cat cat cat cat cat seuss seuss seuss seuss |
| Item Content | . . . |

The sample index entry has substantive fields, including an ID field containing an identifier for the item, a Type field indicating the item's type, a Title field indicating a title of the item, an Author field indicating an author of the item, a Subject field indicating a subject of the item, and an Item Content field (field contents omitted in table) containing content from the item, such as the entire textual content of a book or a shorter passage thereof. The sample index entry further includes a Selection field identifying query terms to which the item is relevant. The facility includes in the selection field for a particular item a number of occurrences for each keyword derived from the score determined for the combination of the item and the keyword. In some embodiments, the facility performs such derivation by dividing the score for the combination by a representation factor, such as the representation factor 25. It can be seen that the Selection field includes eight occurrences of the term "cat," and four occurrences of the term "seuss." These correspond to the sample scores noted above for these two terms. In particular, because the score for "cat" is approximately two times the score for "seuss," the term "cat" occurs twice as many times as the term "seuss" in the Selection field. In various embodiments, the facility employs a variety of approaches to map item/term scores to a number of occurrences of the term in the item's Selection field.

After step 204, the facility continues in step 201 to collect more information. In various embodiments, each cycle of steps 201-204 can be in response to a single search result selection action, a single query, a predetermined number of queries, a period of time of predetermined length, etc.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

Figure 3:
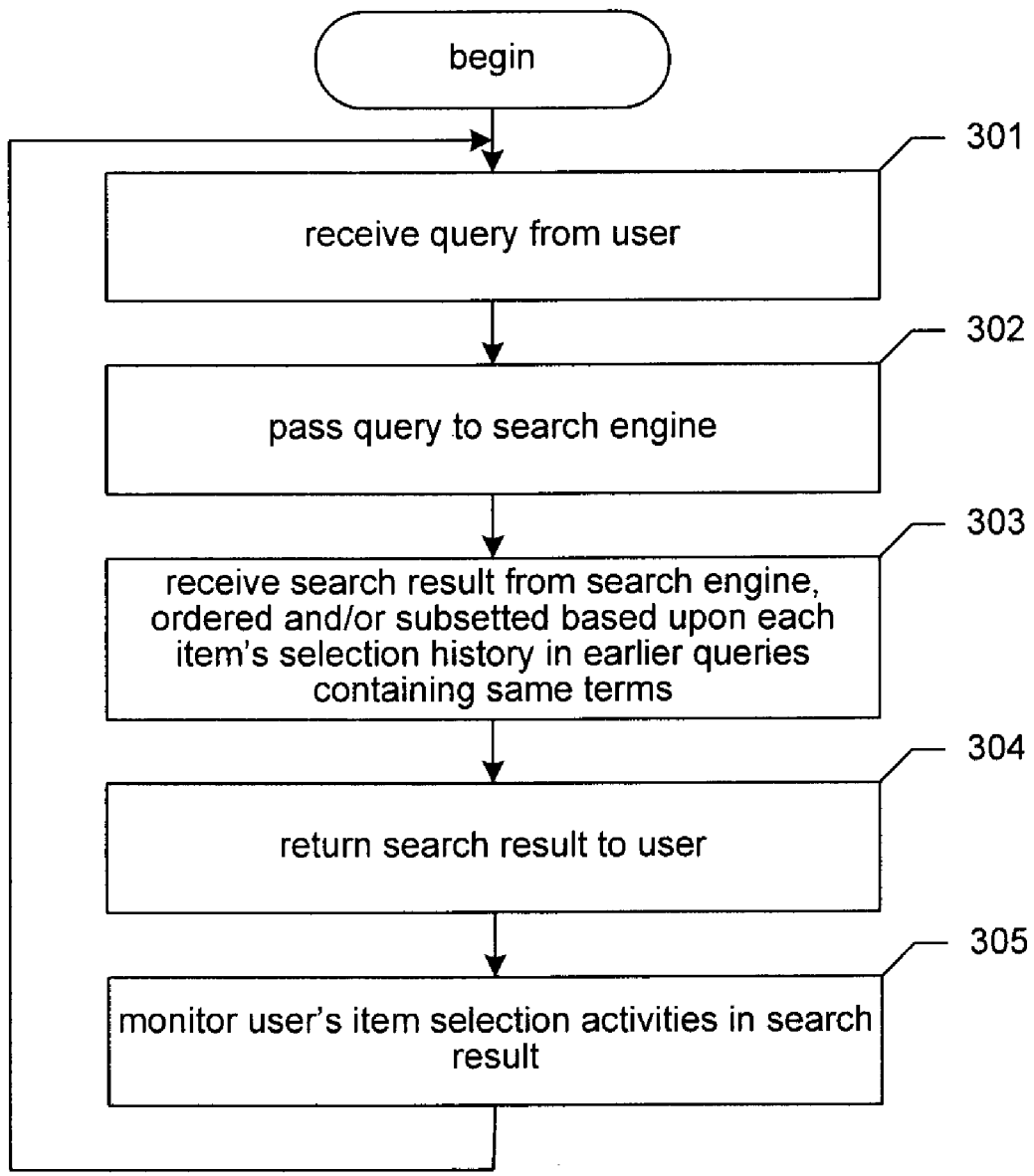
FIG. 3 is a flow diagram showing steps typically performed by the facility in order to process a query.

FIG. 3 is a flow diagram showing steps typically performed by the facility in order to process a query. In step 301, the facility receives a query from a user. In step 302, the facility passes the query received in step 301 to a search engine having access to a search index augmented to include term/item relevancy information based upon item selections in search results. In step 303, the facility receives a search result from the search engine that is responsive to the query passed in step 302. The received search result is ordered and/or subsetted by the search engine based upon each item's selection history in earlier queries containing any of the same terms.

The search result is generated by the search engine using the augmented index discussed above in connection with a set of field weights specified in connection with the index. Table 2 below shows sample field weights corresponding to the sample fields listed in Table 1 above.

TABLE 2

| Field | Weight |
|---|---|
| ID | 500 |
| Type | 100 |
| Title | 100 |
| Author | 80 |
| Subject | 40 |
| Selection | 150 |
| Content | 1 |

The field weights indicate the significance of matching a term contained in the query with a term contained in each field. For example, for the sample query "cat," the only term of the query would match once in the Title field—contributing 100 points to the score for the sample item in the search result—the field's weight of 100 times a single occurrence of "cat" in the Title field—and four times in the Selection field, contributing 1200 points to the score for the sample item in this search result—the Selection field's weight of 150 times eight occurrences of "cat" in the Selection field. Accordingly, the sample item would receive a total score of 1300 in the search result, which would be used to rank it against other items in the search result, and optionally to sort and/or subset the items in the search result.

In step 304, the facility returns the search result received in step 303 to the user. In step 305, the facility monitors the user's item selection activities in the search result, such as by accumulating item selection events in a web log produced by a web server, and/or by separately logging or otherwise tracking such item selection activities. After step 305, the facility continues in step 301 to receive the next query.

It will be appreciated by those skilled in the art that the above-described facility may be straightforwardly adapted or extended in various ways. For example, the facility may be used to produce ranked query results of all types, such as query results containing items of a variety of types. The facility may use various formulae to determine, in the case of each item selection, the amount by which to augment rating scores with respect to the selection. Further, the facility may employ various formulae to combine rating scores into a ranking value for an item. The facility may also use a variety of different kinds of selection actions to augment rating scores, and may augment rating scores for more than one kind of selection action at a time. Additionally, the facility may augment rating scores to reflect selections by users other than human users, such as software agents or other types of artificial users. While the foregoing description makes reference to particular embodiments, the scope of the invention is defined solely by the claims that follow and the elements recited therein. While particular claims are presented using particular claim forms, the inventors contemplate various aspects of their invention in any number of claim forms.

I claim:

1. A method in a computing system for processing a query made up of one or more query terms to identify relevant items, comprising:
   receiving the query to a search engine able to utilize a search index to generate a search result, the search index containing an entry for each item having both (1) one or more item matching fields that contain query terms having a direct association with the item and (2) one or more item selection fields that contain one or more query terms each repeated a number of times representing a level of relevance of each of the one or more query terms to the item, the level of relevance based at least in part upon previous selection actions performed by users with respect to the item, each of the users having submitted a previous query including at least one of the one or more query terms and having received a previous search result identifying the item;
   determining an ordered set of items relating to the received query using the search index and the one or more query terms of the received query, an order of the ordered set of items being determined at least in part by generating a ranking score for each item in the ordered set of items, the ranking score being generated for each item in the ordered set of items by assigning a field score for each occurrence of one of the one or more query terms in one of the item selection and item information fields and summing the field scores for each item; and
   generating a search result made up of the ordered set of items,
   wherein the search engine is able to generate the search result without modifying operation of the search engine.

2. The method of claim 1 wherein the items making up the generated search result are ordered in a way that reflects the extent to which users select the items of the generated search result when the items of the generated search result appear in search results generated for queries having one or more query terms in common with the received query.

3. The method of claim 1 wherein the items making up the generated search result are subsetted in a way that reflects the extent to which users select the items of the search result when the items of the search result appear in search results generated for queries having one or more query terms in common with the received query.

4. The method of claim 1, wherein the search index contains both (1) explicit item fields for matching query terms and (2) implicit item fields indicating the extent to which users select the items of the generated search result when the items of the generated search result appear in search results generated for queries having one or more query terms in common with the received query and is used by the search engine to generate the generated search result.

5. The method of claim 1 wherein the items included in the generated query result with which are associated one or more of the query terms of the received query have textual content that matches one or more of the query terms of the received query.

6. The method of claim 1 wherein the items included in the generated query result with which are associated one or more of the query terms of the received query have textual metadata that matches one or more of the query terms of the received query.

7. The method of claim 1 wherein the generated search result contains items each of which is a different product.

8. The method of claim 1 wherein the generated search result contains items each of which is a different web page describing a product.

9. The method of claim 1 wherein the generated search result contains items each of which is a different web page.

10. The method of claim 1 wherein the generated search result contains items each of which is a different document.

11. The method of claim 1 wherein the generated search result further reflects the extent to which users fail to select the items of the generated search result when the items of the generated search result appear in search results generated for queries having one or more query terms in common with the received query.

12. A computer program product embedded in a computer-readable medium for maintaining an item index able to be used by any search engine able to utilize an item index to generate a search result, the computer program product including instructions that, when executed by a processor, cause the processor to perform steps comprising:
determining that, in a distinguished search result produced by the search engine in response to a distinguished query containing a distinguished query term, a user has selected a distinguished item from the distinguished search result; and
in response to so determining, updating in an index entry for the distinguished item the contents of an item selection field to reflect a tendency of users to select the distinguished item from search results produced by the search engine in response to queries containing the distinguished query term, the contents of the item selection field including one or more query terms each repeated a number of times representing a level of relevance of each of the one or more query terms to the item, the level of relevance corresponding to the tendency of users to select the distinguished item, the updating including adjusting the number of times at least one of the one or more query terms is repeated in the item selection field,
wherein the search engine is able to generate the search results based on the item index including the item selection field by determining an ordered set of items relating to a received query, an order of the ordered set of items being determined at least in part by generating a ranking score for each item in the ordered set of items, the ranking score being generated for each item in the ordered set of items by assigning a field score for each occurrence of one of the one or more query terms in the item selection field and summing the field scores for each item, the search results being generated without modifying operation of the search engine.

13. The computer-readable medium of claim 12 wherein the updating comprises adding the distinguished query term to the contents of an item selection field contained by the index entry for the distinguished item.

14. The computer-readable medium of claim 13 wherein the item selection field contained by the index entry for the distinguished item contains, for each of a plurality of terms, a number of occurrences of the term that reflects the frequency with which users select the distinguished item from search results produced by the search engine in response to queries containing the term.

15. The computer-readable medium of claim 12 wherein it is determined that the user has selected the distinguished item from the distinguished search result by communicating an instruction to purchase the distinguished item.

16. The computer-readable medium of claim 12 wherein it is determined that the user has selected the distinguished item from the distinguished search result by performing at least a threshold level of interaction with the item.

17. The computer-readable medium of claim 12 wherein it is determined that the user has selected the distinguished item from the distinguished search result by adding the distinguished item to a shopping basket.

18. The computer-readable medium of claim 12 wherein it is determined that the user has selected the distinguished item from the distinguished search result by viewing information relating to the distinguished item for at least a threshold period of time.

19. One or more computer memories collectively storing a search engine index data structure and, for each of a plurality of items indexed by the search engine index data structure, comprising:
at least one substantive field containing query terms that are among data or metadata of the item; and
at least one item selection field containing one or more query terms, each of the one or more query terms contained in the at least one item selection field being a query term that, when included in queries whose search results contain the item, frequently coincide with a user selecting the item from such search results, the one or more query terms in the at least one item selection field being repeated a number of times representing a level of relevance of each of the one or more query terms to the item, the level of relevance based at least in part upon a number of users having selected the item from the search results,
the contents of the search engine data structure being usable by any search engine, able to use the index data structure to generate search results, to determine an ordered set of items relating to a received query, an order of the ordered set of items being determined at least in part by generating a ranking score for each item in the ordered set of items, the ranking score being generated for each item in the ordered set of items by assigning a field score for each occurrence of one of the one or more query terms in the at least one item selection field and the at least one substantive field and summing the field scores for each item,
wherein the search engine is able to generate the search results without modifying operation of the search engine.

20. The computer memories of claim 19 wherein the item selection field contains a number of occurrences of each term that is directly related to the relative rate of selection for each of the terms.

21. A computing system for processing a query made up of one or more query terms, comprising:
a processor and memory collectively providing,
a search engine capable of processing a received query against an index, the search engine being any search engine able to utilize an index to generate search results; and
an index that, when used by the search engine to process the received query, causes the search engine to produce a query result that both includes items having data or metadata matching the query terms of the received query and reflects an extent to which users have selected the items of the generated search result when the items of the generated search result have appeared in search results generated for previous queries having one or more query terms in common with the received query, the index including at least one item selection field containing one or more query terms each repeated a number of times representing a level of relevance of the each of the one or more query terms to the item the level of relevance based at least in part upon the extent to which users have selected the item from the generated search result, wherein the search engine produces the query result by determining an ordered set of items relating to the received query, an order of the ordered set of items being determined at least in part by generating a ranking score for each item in the ordered set of items, the ranking score being generated for each item in the ordered set of items by assigning a field score for each occurrence of one of the one or more query terms in the at least one item selection field and summing the field scores for each item, wherein the search engine is able to generate the search results without modifying operation of the search engine.

22. The computing system of claim 21 wherein the index indicates, for each of a plurality of items, both terms that are among data or metadata for the item, as well as terms that have commonly occurred in queries from whose search results the item has been selected.

23. The computing system of claim 21, further comprising an index augmentation subsystem that periodically augments the index to reflect recent item selection information.

* * * * *